May 18, 1926. Re. 16,353
S. B. WAXMAN
LINING AND METHOD
Original Filed Dec. 15, 1923
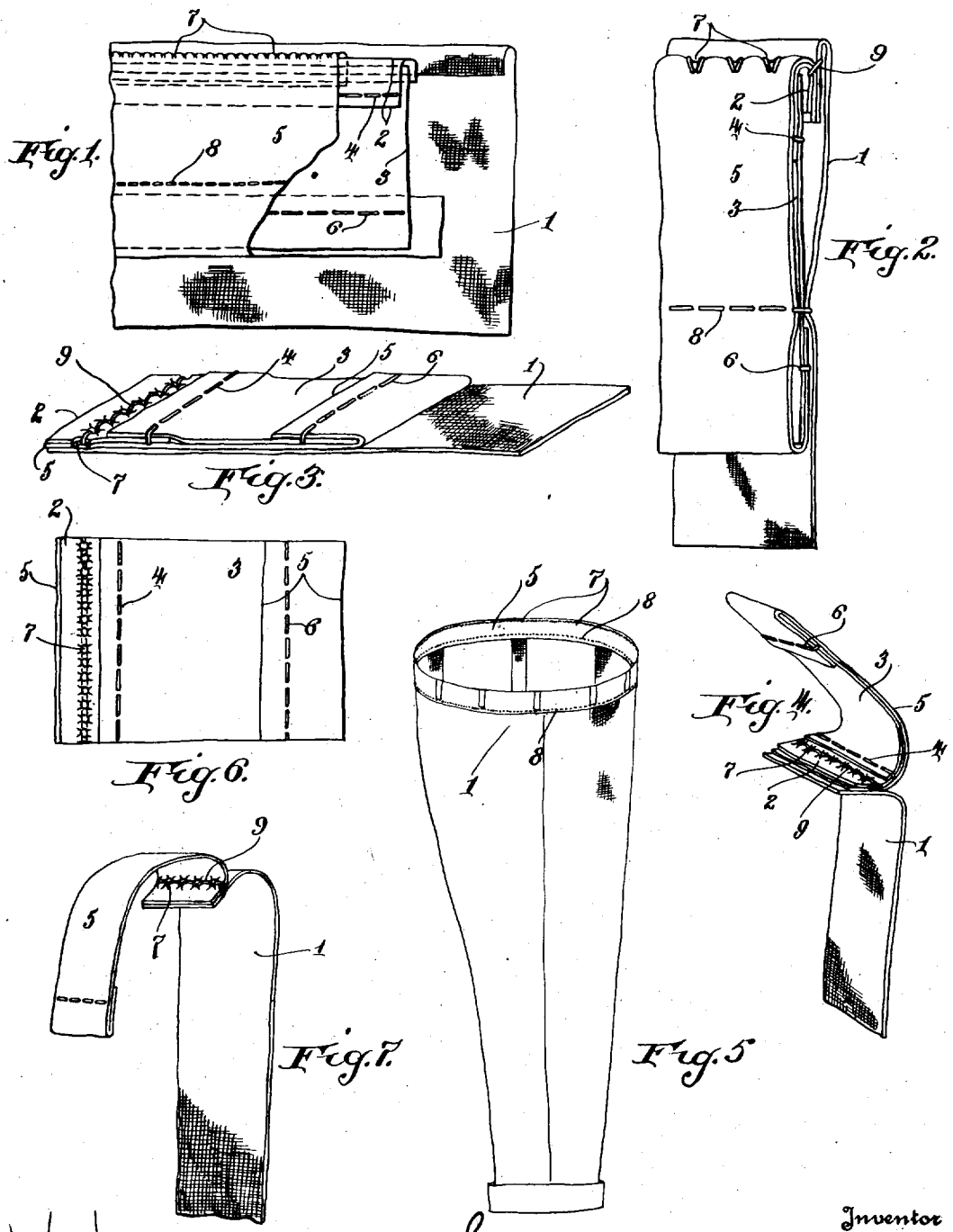
Witnesses
Porter W. Hamilt
Ada Smith
Inventor
Samuel B. Waxman
By Edwin H. Samuels
Attorney Reissued May 18, 1926.

Re. 16,353

UNITED STATES PATENT OFFICE.

SAMUEL B. WAXMAN, OF BALTIMORE, MARYLAND.

LINING AND METHOD.

Original No 1,514,594, dated November 4, 1924, Serial No. 680,996, filed December 15, 1923. Application for reissue filed February 9, 1926. Serial No. 87,163.

The invention relates to a method of lining the waist band of trousers and similar garments, and to such a lining which has the appearance of hand work but is produced by machine.

An allied improvement is disclosed in the applicant's co-pending application No. 723,825, filed July 2nd, 1924 and of which this application is a continuation in part.

In accordance with the invention I first stitch the waist band lining strip, forming a line of stitching which is spaced a suitable distance from the edge, the line of stitching including stitches extending transversely to the direction of the line of stitching. A type of stitching adapted to the purpose of the present invention is the hemstitch and the stitching operation referred to has been, in the practice of the present invention, most generally performed by means of a hemstitching machine. The edge of the binding or lining material thus stitched, or preferably hemstitched, is then laid against the cloth of which the garment is composed and the lining material is sewed to the cloth by a line of stitching which follows closely the line of hemstitching or similar stitch referred to. The second line of stitching being preferably in the center of the hemstitching and extending through and through the material along what may be termed the center line of the hemstitching. The lining is then turned over on the line of stitching, placing it inside the garment at the top and pressed in position. The stitching by which the lining or binding is secured to the garment and all the other necessary sewing in this connection is easily and conveniently and quickly accomplished by machine, and the top edge of the binding as thus finished and sewed to the garment, has, due to the presence of the hemstitching, the appearance of elaborate careful handwork, being at the same time produced at an incomparably less expense of time and money than that at which it could be produced by hand.

In the accompanying drawing I have illustrated a waist binding made in accordance with my method and embodying the features of the article of my invention in the preferred form.

In the drawing:

Figure 1 is a fragmentary inside view of a portion of a trousers garment taken at the waist line and showing the waist band, the overlying pieces of material being cut away in such a manner as to expose the underlying pieces of material and to show their arrangement.

Figure 2 is a somewhat similar view on an enlarged scale showing a smaller fragment of a garment, the material being sectioned at the righthand side of the view to illustrate the arrangement thereof a little more clearly than in Figure 1.

Figure 3 is a similar fragment of the garment in perspective and in the course of construction, showing the lining when first sewed to the top edge of the cloth composing the garment and before it is turned over to the inside, that is, the binding is lying on the outside of the garment.

Figure 4 shows a similar fragment at a slightly later period in the production of the garment, the lining material and the cloth being spread apart in the course of turning the binding over from the outside toward the inside of the garment.

Figure 5 is a perspective view of a pair of trousers top lined in accordance with the invention.

Figure 6 is a plan view of a binding band in accordance with the invention, hemstitched and ready to be sewed to the garment along the line of the hemstitching as aforesaid.

Figure 7 is a perspective view of a fragment of waist band showing the method applied to a lining of a single thickness without stiffening or reinforce, the stiffening and reinforcing members being removed to give additional clearness of illustration.

In order that the method and article of the invention may be clearly understood, one of the various waist band constructions which may be made in accordance with the invention will be described.

In the drawings the cloth of which the garment is made is the darkly shaded portion 1. In producing the construction shown, I have first sewed a piece of tape 2 to the edge of a strip of canvas 3 by a seam 4, and have then sewed a piece of twilled fabric 5 forming the lining material, to the opposite edge of the canvas by a seam 6, the binding or lining material being sewed near its edge to one side of the canvas near one edge by said seam 6, and the tape being sewed along its edge to the other side of the canvas along the opposite edge thereof by the seam 4. The lining material which is wider than the canvas is then turned under the edge of the canvas near which it is sewed by the seam 6 and folded back until its opposite edge is under the tape 2.

The tape and the lining material are then hemstitched together or otherwise stitched with a line of machine stitching comprising stitches extending transversely to the direction of the line of stitching. This is accomplished by passing the binding through a hemstitching machine, or other machine to produce the stitching described. This line of stitching is indicated by reference character 7, the object being to so stitch the lining as to produce a hand made effect by the method described. The lining is then laid on the outside of the garment along the top edge with the hemstitching or similar stitching on the line which is intended to form the exact top edge of the lining and sewed at 9 through the hemstitching. The lining and the top edge of the cloth with it are then turned over inside the garment where it may be again sewed by stitching 8 and pressed or pressed without sewing in such a manner that the hemstitching as aforesaid comes just inside the top edge of the garment.

While I have described in detail a preferred form of lining, I would have it understood that the stiffening, i. e., the canvas and the tape and other details are more or less incidental and immaterial, the important feature of the invention being, as aforesaid, the manner of lining or top lining the garment by hemstitching the waistband lining in the direction of the length of the edge line or waist line and sewing the lining to the garment along the line of the hemstitching and near the edge of the cloth so that when the lining is turned against the inside of the garment material or cloth, the hemstitching comes at the edge of the lining.

Broadly defined, the lining method referred to consists in stitching a strip of lining material in a longitudinal direction forming a line of stitching with stitches extending transversely to said line of stitching, or hemstitching it in the direction of its length, then sewing the lining to the cloth of the garment along the edge of the cloth and along the first mentioned line of stitching i. e., the hemstitching or the like and folding the lining material over on the second line of stitching so that the first mentioned line of stitching appears at the top edge of the lining.

While the method of my invention, as thus described, is based on the illustration contained in Figures 1 to 6, it is best illustrated in Figure 7 referred to as diagrammatic, which shows a single thickness of lining material 5 stitched at 7 to form a line of hemstitching or similar stitching, the lining being laid on the outside of the garment fabric near the top and sewed by means of a line of stitching 9 through the hemstitching. The line of stitching 9 passes through the fabric of the garment and the lining sewing the lining to the fabric, the lining and top edge of the garment being then turned over to the inside of the garment and pressed, the fold in the lining being on the line of stitching.

Having thus described my invention, what I claim and desire to secure by Letters Patent is:

1. The method of lining the waist band of a trousers garment which consists in hemstitching a piece of lining material, sewing the lining to the cloth along the edge of the cloth and along the line of the hemstitching, and folding the material over on the line of the hemstitching so that the hemstitching forms the edge of the lining.

2. In a garment a lining which comprises a piece of lining material hemstitched and sewed to the garment, through and on the line of the hemstitching and turned over against the inside of the garment on said line.

3. In a garment a waist band lining consisting of lining material hemstitched along an edge and sewed to the cloth forming the garment near the top edge thereof and through and on the line of said hemstitching, the edges of the lining and the edge of the cloth forming the garment being turned in between the cloth and the lining.

4. A lining for trousers garments comprising a piece of lining material, a piece of tape extending around the waist line, a line of hemstitching connecting the tape to the lining material, a seam sewed through the lining and tape, and through the hemstitching, connecting the lining and tape to the cloth forming the garment near the top edge thereof, the lining thus constructed and the top edge of the cloth being turned over inside the garment on the line of the hemstitching.

5. In a garment, a lining which comprises a piece of lining material, a line of stitching extending along said lining material and including stitches extending transversely to the direction of the line of stitching, and a second line of stitching, the lining being sewed to the garment by said second line of stitching through and on the line of said first line of stitching and turned over against the inside of the garment on said second line of stitching.

6. In a garment, a waist-band lining consisting of lining material stitched in a line along an edge, said line including stitches extending transversely to said edge and a second line of stitching, the lining being sewed by said second line of stitching to the cloth forming the garment near the top edge thereof through and on the line of said first line of stitching, the edges of the lining and the edge of the cloth forming the garment being turned in substantially on the second line of stitching and between the cloth and the lining.

7. The method of lining the waist band of a garment which consists in stitching a piece of lining material, forming a line of stitching with stitches extending transversely to said line of stitching, then sewing the lining to the cloth of the garment along the edge of the cloth, forming a second line of stitching along the first mentioned line of stitching, and folding the lining material over on the second line of stitching so that the first mentioned line of stitching appears at the top edge of the lining.

Signed by me at Baltimore, Maryland, this 4th day of February, 1926.

SAMUEL B. WAXMAN.